Figure 1:
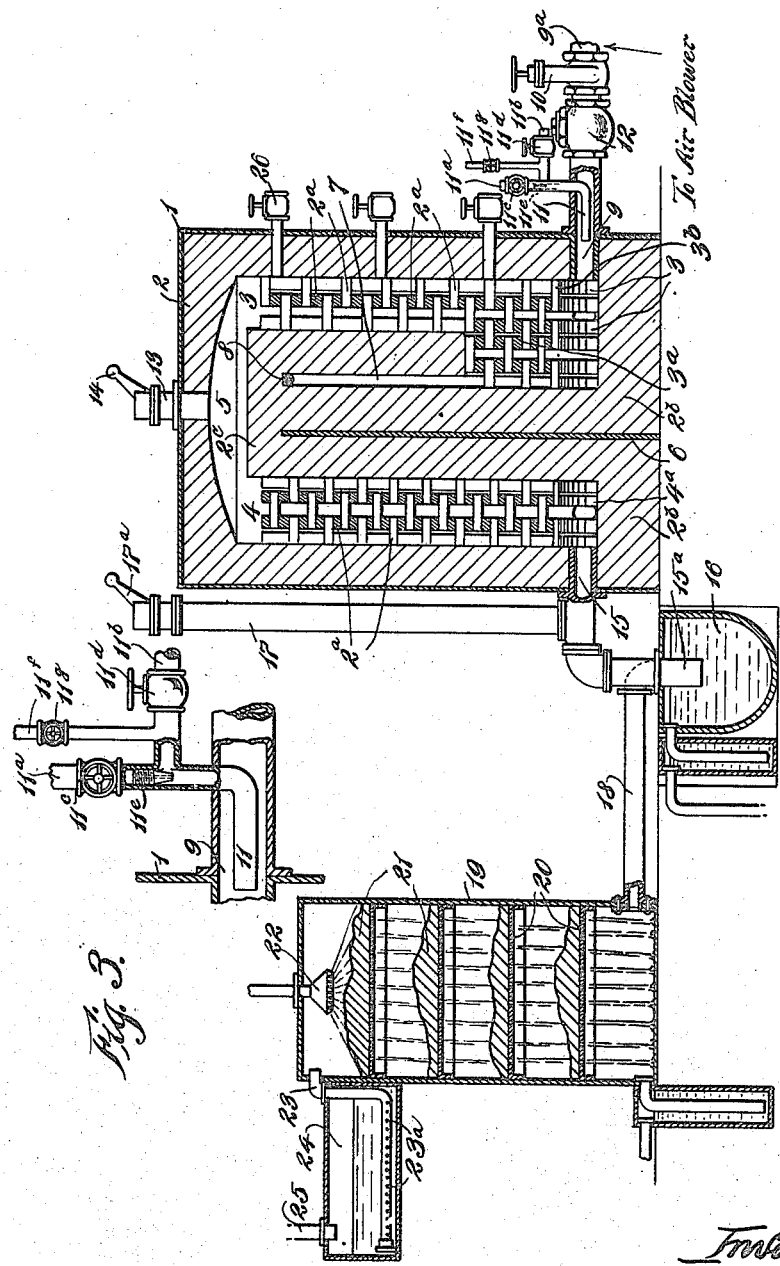

J. R. ROSE.
PROCESS OF MANUFACTURING GASEOUS FUEL.
APPLICATION FILED MAY 19, 1916.

1,254,360.

Patented Jan. 22, 1918.
2 SHEETS—SHEET 2.

UNITED STATES PATENT OFFICE.

JAMES R. ROSE, OF EDGEWORTH, PENNSYLVANIA.

PROCESS OF MANUFACTURING GASEOUS FUEL.

1,254,360.   Specification of Letters Patent.   Patented Jan. 22, 1918.

Original application filed November 29, 1915, Serial No. 64,100. Divided and this application filed May 19, 1916. Serial No. 98,552.

*To all whom it may concern:*

Be it known that I, JAMES R. ROSE, a citizen of the United States, residing at Edgeworth, in the county of Allegheny and State of Pennsylvania, have invented a certain new and useful Improvement in Processes of Manufacturing Gaseous Fuel, of which the following is a full, clear, and exact description, reference being had to the accompanying drawings.

This invention relates to a process of manufacturing gaseous fuel, and more particularly to the production of a gaseous fuel to which I have applied the name "carbo-hydrogen" and which is particularly adapted for use in connection with the cutting and welding art. It is the general object of the invention to produce a gaseous fuel which will be of a high heating value but which will require for its combustion a minimum quantity of oxygen whereby cutting, for instance, may be accomplished with a great saving in the expense of the oxygen required and with an efficiency at least equal to that obtained with the use of acetylene and other gases requiring for their combustion a large quantity of oxygen. Obviously the use of a gas of the kind which it is the object of this invention to produce will result in a large saving of expense in the cutting and welding art.

A further object of the invention is to produce a combustible fluid of the character referred to in a particularly efficient and economical manner.

Further and more generally stated, the invention may be defined as consisting of the gas, and the combinations of steps involved in the production thereof, embodied in the claims forming part hereof.

As is well known, ordinary illuminating gas has approximately the following composition:

Hydrogen _____ 45%
Carbon monoxid _____ 40%
Hydrocarbon of the general formula
 $C_nH_{n+2}$ _____ 15%

Also, as is well known, natural gas is principally methane, having the formula $CH_4$. While either the artificial or the natural gas may be used for cutting or welding purposes, the relatively high proportion of the carbon constituent in either of these gases requires for its combustion a large proportion of oxygen, making their use for cutting or welding purposes very expensive. By the process set forth herein, I am enabled to produce a fixed gas containing hydrogen and hydrocarbons of high heating value. In producing the gas, natural gas or oil is conducted through a retort or generator having a refractory lining, the said gas or oil and an additional hydrocarbon fluid being subjected to such heated refractory lining. Where the lining is maintained at a temperature of about 2200° F. and natural gas is used, the resultant gas will contain approximately 85% of hydrogen, 10% of a gas of the $CH_4$ series, and 5% of a gas of the $C_6H_6$ series. By increasing the temperature of the refractory lining, the proportion of hydrogen will be increased and the proportion of the hydrocarbon gas constituents will be decreased until, at about 3000° F., the resultant gas will contain hydrogen in approximately the proportion of 98% and 2% of the aforesaid hydrocarbons. The gas such as is produced at the lower temperature and having substantially the proportions of hydrogen and hydrocarbon gas set forth is particularly efficient for cutting and welding with oxygen and is the gas referred to hereinbefore and sold to the trade under the name of "carbo-hydrogen." A gas having the higher proportion of hydrogen and the lower proportion of hydrocarbon, produced at the maximum temperature, is particularly useful for burning lead.

Figure 2:
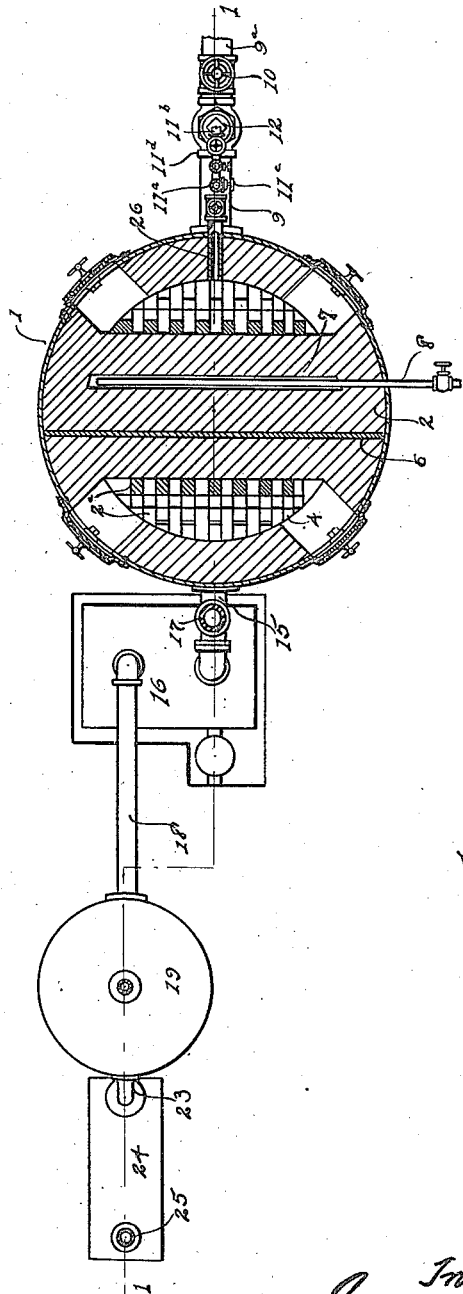

In the drawings forming a part hereof I have illustrated a form of apparatus which is particularly well adapted for producing the gas referred to hereinbefore, this apparatus forming the subject matter of my application #64,100, filed Nov. 29, 1915, of which application the present application is a division. In these drawings, Figure 1 is a longitudinal vertical sectional view through an apparatus capable of realizing the process of producing my gaseous fuel, said section corresponding to the line 1—1 of Fig. 2; Fig. 2 is a view, partly in section and partly in plan, of the apparatus shown in Fig. 1, the section being taken just above the pipe 8: and Fig. 3 is an enlarged detail, partly in section and partly in elevation, of the connections for supplying fluids to the bottom of the apparatus.

Describing by reference characters the various parts illustrated in the drawings, 1 denotes the outer shell and 2 the refractory lining and filler of a generator, which generator is shown as cylindrical. This refractory lining and filler may be of any suitable well known material, and the generator is so constructed as to provide a front flue 3 and a rear flue 4 communicating at their upper ends by a transverse passageway 5. Refractory material $2^a$ is arranged in "checker-work" formation within the flues 3 and 4 as well as in a chamber $3^a$ projecting from the bottom of the flue 3, said chamber being adapted to receive an enriching fluid in a manner to be described hereinafter.

It will be observed that the bottoms of the flues 3 and 4 and the chamber $3^a$, are located a distance above the bottom of the generator body, whereby an ample thickness of refractory material $2^b$ is provided below such chambers.

6 denotes a partition, preferably of sheet steel, extending transversely across the generator between the flue 3 and chamber $3^a$ and the flue 4 and extending from the bottom of the generator upwardly to a distance below the top of the refractory dividing wall $2^c$. This partition prevents seepage of gases from the flue on one side thereof to the flue on the opposite side thereof. 7 denotes a chamber extending upwardly from the inner or rear end of the chamber $3^a$, preferably substantially as high as the partition 6, and having in the upper portion thereof a spray pipe 8.

9 denotes an inlet connection pipe communicating with the front or charging wall of the generator 1 and discharging into the bottom of the flue 3. This connection is provided at its outer end with a gate valve 10 and is extended, as indicated at $9^a$, to a suitable air blower (not shown). 11 denotes a nozzle through which a suitable preheating fluid (such as gas, or liquid hydrocarbon) mixed with air (if desired) may be introduced into the bottom of the flue 3 beneath the arch $3^b$. This nozzle preferably extends axially into the connection 9 and is adapted to receive gaseous and liquid fuel from the pipes $11^a$, $11^b$, respectively, each having a valve, indicated at $11^c$, $11^d$, respectively, there being an injector nozzle $11^e$ within the pipe $11^a$ in operative relation to the lateral branch extending from said pipe and to which the pipes $11^b$ and $11^f$ are connected whereby, if desired, the gas which is supplied through the pipe $11^a$ may be used in coöperation with either of the fluids supplied through the pipes $11^b$ and $11^f$ and, in the case of oil, assist in injecting the same.

The flues 3 and 4 and the chamber $3^a$ are provided with the checker work filling of refractory material referred to hereinbefore and indicated at $2^a$, while the transverse passageway 5 is provided with an outlet connection 13 having a weighted blow-off or pressure-relief valve therein, the operating handle whereof is indicated at 14.

From the arch $4^a$ at the bottom of the flue 4 there extends an outlet flue 15, the discharge end of which projects into a vessel 16, the lower end $15^a$ of such flue being sealed by suitable liquid within the receptacle. Projecting upwardly from the outlet flue 15 is a pipe 17 having a pressure-relief valve therein similar to the valve in the pipe 13, the operating handle of the valve being indicated at $17^a$.

From the top of the receptacle 16 and having its inlet end above the liquid therein extends a pipe 18, which communicates with the bottom of the scrubbing tank 19, having a series of transverse, perforated partitions therein with suitable porous material 21 on said partitions and a spraying nozzle 22 in the upper end thereof above the uppermost partition and the material thereon. From this scrubber a pipe 23 extends into a tank 24 which may contain a hydrocarbon liquid of one of the higher or richer series, the pipe 23 being provided with perforations $23^a$ beneath the top of the liquid in said tank whereby the gas discharged from the scrubber may be further enriched. From the enriching tank 24 a pipe 25 leads to a storage tank or to the point of use. From the front of the furnace 1, there project pipes or connections 26 which provide means for applying pyrometers to the chamber 3 or for the application of instruments for estimating the temperature by observation, as by a color test.

In operation, gas (artificial or natural) or liquid hydrocarbon (such as crude or refined oil) is introduced into the bottom of the flue 3 and chamber $3^a$, from the pipe $11^a$ or the pipe $11^b$, respectively. In the case of gas, the gas will be introduced under the ordinary city or tank pressure; in the case of oil, the fuel will be pumped or sprayed into the bottom of the chamber; in either case, the hydrocarbon fuel is mixed with air (or steam, as may be desired); where air is used it is preferably supplied through the pipe $9^a$. This mixture of hydrocarbon and air, being ignited, burns in contact with the refractory material 2 in the front and rear flues until the desired temperature is attained, as indicated by the pyrometers or sight tubes. The products of combustion resulting from this preheating operation will escape through the upper end of the pipe 17, the valve being opened or lifted by its handle $17^a$ for the purpose of facilitating the discharge of such gases.

After the "blowing-up" or preheating operation, the fluid which is to be broken up and otherwise changed (preferably natural gas) will be introduced into the bottom of the front chamber through the pipe 11$^f$, said pipe being provided with the valve 11$^g$. This fluid, coming into contact with the preheated refractory material, will, in its long and tortuous passage through the heated zone thus provided, be partly disassociated into carbon and hydrogen. In order to enrich the gas thus produced, a liquid hydrocarbon, preferably of heavier gravity than that introduced into the bottom of the flue 3 and chamber 3$^a$, will now be sprayed into the chamber 7 through the pipe 8. This hydrocarbon will be partly disassociated in the chamber 7, it being noted that the chamber 7 is within the refractory filler and in such proximity to the flues 3 and 4 as to be heated thereby. Some of the solid carbon which will be produced will be carried through the generator and deposited in the trap 16. A large proportion of such solid carbon will, however, be deposited upon the refractory material 2 and will be consumed during the next blowing-up or preheating operation, thus utilizing its heat of combustion in the production of the enriched gas in the generator.

Through the disassociation of the gas introduced through the nozzle 11, hydrogen in a nascent condition will be produced, along with carbon monoxid. This disassociation will ordinarily occur within the first eighteen inches of the vertical movement of the fluids in the chambers 3, 3$^a$. On the other hand, the hydrocarbon introduced through the pipe 8 will be gradually broken up or disassociated as it descends the chamber 7 and traverses the chamber 3$^a$ and flue 3. In its passage through the flues 3 and 4, it will, through the high temperature to which it is subjected in the long refractory-lined passageway of the generator, be further disassociated and combined chemically with the fluid introduced through the nozzle 11. The final result of the chemical action in the generator under the conditions hereinbefore set forth will result in the production of a fixed gas, having a higher heating value and requiring far less oxygen for its combustion than the fluid which was introduced through the nozzle 11. Where natural gas is the gas or fluid fuel introduced through the nozzle 11 after the preheating operation and where crude oils are employed for the liquid fuel discharged into the flue 7 through the pipe 8, there will result, from the chemical action which takes place in the generator under the influence of the heat retained in the checker work refractory filling and the heat resulting from the combustion of the carbon deposited on such filling, a gas which, when the lining is at substantially the temperature of 2200° F., will contain approximately 85% hydrogen, 10% of a gas of the $CH_4$ series and 5% of a gas of the $C_6H_6$ series.

The gas thus produced in the generator 1 will be conducted through the trap 16, which will trap any solid carbon that may be present and will then be conducted through the scrubbing tank 19 as explained heretofore, and may then be further enriched, if desirable, by being discharged into and through the hydrocarbon liquid in the enriching tank 24.

This hydrocarbon liquid in the tank 24 may be benzene, naphthalene, or any other volatile hydrocarbon of a sufficiently high series, and the resultant fluid will not separate or stratify when stored under pressure.

At the end of the operation, because of the disassociation of the hydrocarbon supplied through the nozzle 11 and pipe 8, a considerable quantity of solid carbon will be deposited upon the refractory material with which the generator chambers are supplied. This will furnish a material part of the combustible agent whereby the refractory material will be heated during the next "blowing-up" operation.

In the practice of the process, the refractory material 2$^a$ eliminates from the gaseous and liquid fuels subjected thereto a large amount of carbon which is not only an unnecessary, but an undesirable, constituent of gas employed for cutting and welding purposes, because such carbon requires for its consumption a large amount of oxygen, and this oxygen is not oxygen present as an ingredient of the air but is the commercially pure and expensive oxygen employed in the cutting and welding art.

Where oil is employed in place of natural gas, it will be introduced through the pipe 8 and, in its transit through the generator, will be converted into a gas having the same proportions of hydrogen as before but with no gas of the $CH_4$ series, the resultant gas, according to the temperature in the generator, containing from 85% to 98% hydrogen and from 15% to 2% of a gas of the $C_6H_6$ series.

In actual practice, I have supplied one barrel (fifty gallons) of forty gravity oil per hour through the pipe 8, and have supplied natural gas to the generator at the rate of thirty cubic feet per minute and as a result have produced the gaseous fuel "carbo-hydrogen" at the rate of one hundred and sixty cubic feet per minute.

Having thus described my invention, what I claim is:—

1. The process of producing gaseous hydrocarbon fuel which comprises subjecting methane and the vapors of a liquid hydrocarbon to a temperature not materially less than 2200° F., whereby said gas and vapors are disassociated, and removing from such disassociated fluids a relatively high proportion of the carbon content, whereby a gas of high heating efficiency and of low carbon content will be produced.

2. The process of producing gaseous hydrocarbon fuel which comprises subjecting methane to a temperature not materially less than 2200° F., thereby to break up or disassociate the same, introducing into the resultant gaseous product the vapors of a liquid hydro-carbon, and passing the resultant mixture in contact with refractory material heated to a temperature of not materially less than 2200° F., whereby a gas of high heating efficiency and low carbon content will be produced.

3. The process of producing gaseous hydrocarbon fuel which comprises subjecting methane to a temperature sufficient to break up the molecules thereof, introducing into the resultant gaseous product the heated vapors of a liquid hydro-carbon, and bringing the temperature of the resultant mixture to a point not materially less than 2200° F., whereby a gas is produced of higher heating value and of lower carbon content than the original hydro-carbon fluids.

4. The process of producing gaseous hydrocarbon fuel, which comprises supplying methane and a second hydro-carbon fluid differing in carbon content therefrom through an elongated duct containing refractory material heated to a temperature of not materially less than 2200° F., whereby a gas of higher heating value and of lower carbon content than the original fluids will be produced.

5. The process of producing gaseous hydrocarbon fuel, which comprises supplying methane to one end of an elongated flue having refractory material therewithin, heated to a temperature of not materially less than 2200° F., supplying to an intermediate portion of said flue the fluids resulting from the heating of a liquid hydro-carbon, and conducting the mixture of fluids through said flue.

6. The process of producing gaseous hydrocarbon fuel, which comprises heating methane to a temperature sufficient to disassociate the same, adding to the gases thus produced a liquid hydro-carbon, and subjecting the resultant mixture to a temperature not materially less than 2200° F.

7. The process of producing gaseous hydrocarbon fuel which comprises heating methane to a temperature sufficient to disassociate the same, adding to the gases thus produced a liquid hydro-carbon, subjecting the resultant mixture to a temperature not materially less than 2200° F., and impregnating the gas thus obtained with the vapors of a volatile liquid hydro-carbon.

In testimony whereof, I hereunto affix my signature.

JAMES R. ROSE.